United States Patent
DiMaggio et al.

(10) Patent No.: US 6,526,356 B1
(45) Date of Patent: Feb. 25, 2003

(54) ROCKET ENGINE GEAR DEFECT MONITORING METHOD

(75) Inventors: Samuel J. DiMaggio, Manhattan Beach, CA (US); Brian H. Sako, Calabasas, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 09/884,719

(22) Filed: Jun. 19, 2001

(51) Int. Cl.$^7$ ............................................... G06E 19/00
(52) U.S. Cl. ...................................................... 702/35
(58) Field of Search ........................... 702/35, 183, 185, 702/75, 76, 77

(56) References Cited

U.S. PATENT DOCUMENTS

| | | | | |
|---|---|---|---|---|
| 4,435,751 A | * | 3/1984 | Hori et al. | 700/280 |
| 4,827,516 A | * | 5/1989 | Tsukahara et al. | 704/224 |
| 4,931,949 A | * | 6/1990 | Hernandez et al. | 702/35 |
| 5,566,092 A | * | 10/1996 | Wang et al. | 702/185 |
| 6,204,922 B1 | * | 3/2001 | Chalmers | 356/381 |

OTHER PUBLICATIONS

Decker, H.J., Zakrajsek, J.J., "Enhancement of the NA4 Gear–Vibration Diagnostic Parameter" NASA Tech Briefs, vol. 21, No. 5 Feb. 1997.

Courrech, J. "Condition Monitoring of Machinery" Chapter 16, *Shock and Vibration Handbook*, 4th Ed., McGraw–Hill, 1996.

Gerard Dans, "Cepstrum and its Interpretation" Vibration Institute Discussion Zone, Design Notes, May 19, 1999.

* cited by examiner

Primary Examiner—Michael Nghiem
(74) Attorney, Agent, or Firm—Derrick Michael Reid

(57) ABSTRACT

Vibration and tachometer measurements are used to assess the health of rotating equipment to compute and store two sided cepstrum parameters used to compare the engine performance to a class of engines for determining out-of-family performance indicating the healthy or defective nature of the engine under test. The cepstrum parameter can be viewed after static test firing of a rocket engine and analyzed for changes in the cepstrum parameter further indicating defect growth during static test firing. Engine-to-engine comparisons of vibration-related parameters can be used to provide information on abnormal gear behavior. The cepstrum is defined as the inverse discrete Fourier transform of the logarithm of two-sided autospectral density. The test method is an effective screen for determining defective rocket engine components during preflight static testing.

20 Claims, 4 Drawing Sheets

DIGITAL SIGNALS PROCESSING SYSTEM

ROCKET ENGINE TEST SYSTEM

FIG. 1

DIGITAL SIGNALS PROCESSING SYSTEM

FIG. 2

FIG. 3A AUTOSPECTRAL DENSITY DEFECT INPUT

FIG. 3B FREQUENCY RESPONSE FUNCTION MAGNITUDE SQUARED

FIG. 3C NOMINAL AUTOSPECTRAL DENSITY

FIG. 3D AUTOSPECTRAL DENSITY DEFECT OUTPUT

FIG. 3E AUTOSPECTRAL DENSITY PRIOR TO FAILURE

FIG. 4A  NOMINAL CEPSTRUM

FIG. 4B  CEPTRUM JUST PRIOR TO FAILURE

FIG. 5A  NOMINAL ENGINE PARAMETERS

FIG. 5B  ENGINE FAILURE PARAMETERS

ROCKET ENGINE GEAR DEFECT MONITORING METHOD

BACKGROUND OF THE INVENTION

The monitoring of rotating machinery and gears using vibration measurements for determining the operating performance and condition is an established process in many industries. Vibration measurements are commonly acquired for test data processing using accelerometers placed on the rotating machinery to evaluate the condition of rotating equipment. Monitoring methods have been applied to the preflight evaluations of rocket engines. Effective monitoring tools are needed for preflight testing of rocket engine turbopumps. With the current trend toward reusable launch vehicles that will require the turbomachinery to operate for extended periods of time and on multiple missions, active monitoring of the condition of the internal components of the rocket engine becomes more important. In an effort to increase performance, expendable launch vehicle rocket engine turbopumps are sometimes operated at speeds and loads for which the engines were not initially designed. The consequence of this increased loading is that structural margins are decreased and the potential for hardware damage or catastrophic failure increases. For a particular expendable launch vehicle engine, two cases of liquid oxygen gear damage, including a catastrophic failure, have been observed during acceptance and development ground testing of the hardware. In order to mitigate the risk associated with the decreased structural margins, a drive train diagnostic procedure is needed.

In order to gain insight into the behavior of a rocket engine prior to flight, vibration response data is acquired during acceptance tests known as static firings or hot runs. During hot runs, the engine is fixed in a test stand and ignited. The steady-state data acquired is then analyzed to determine quantitative parameters that are used to assess the vibration signature of an engine. During rotating machinery analysis, particular vibration signatures are related to specific types of component defects. For example, discrete gear tooth defects are often characterized in the frequency domain by the appearance of spectral components at higher order harmonics of the speed of the shaft upon which the faulty gear is located.

The simplest fault detection techniques use the change in statistical properties of the vibration signal as a measure of engine health. Relevant vibration parameters that have been used include both the root mean square value and the kurtosis. While these vibration parameters provide a single number that can potentially indicate a defect in the system, the vibration parameters can not identify the source leading to a change in vibration level. Some gear fault detection methods use an analytic envelope signal to provide information on the modulation of the gear mesh frequency. However, due to the extremely high operating speeds of rocket engine turbopumps, measurements of the vibration responses up to the gear mesh frequency are often beyond the capability of the data acquisition instrumentation. More recently, wavelet transforms have been used for gear fault detection.

There are several problems associated with current methods of testing rocket engine turbomachinery. Current methods of testing rocket engine turbomachinery are often used to monitor bearing conditions and typically use trend analysis with a one-sided cepstrum analysis. These methods do not provide quantitative parameters for monitoring rocket engine gears developed from the one-sided cepstrum analysis. For turbomachinery with operating ranges typical of those experienced in rocket engines, the resolution of the one-sided cepstrum analysis approach yields results that are not as easily interpreted.

In conjunction with vibration measurements acquired during tests or operation of a rotating machine, digital signal processing techniques are used in condition assessment procedures. Analysts have used a one-sided autospectral density and the one-sided cepstrum for computation purposes to indicate gear performance. The one-sided cepstrum method in particular, has been used to detect damage in both rolling element bearings and gears. Partly due to the susceptibility of engine and transmission components to fatigue failures, there has been research directed at effective detection of gear tooth damage.

The typical practice in most machinery analysis is to establish a baseline for a specific machine and subsequently implement a regular monitoring schedule. Typical rotating machinery can be compared to a baseline over an expected operating life measured over many years. In a trend analysis process, changes in relevant parameters are then tracked over the life of the machine. However, the life of an expendable launch vehicle rocket engine turbopump, including acceptance testing and operational missions, is measured in minutes. The turbopump is usually test fired at least twice prior to delivery to the customer in order to show that acceptable performance limits are met. These test firings generally last for several minutes each. Due to limited available engine life, it is desirable to perform as few tests as possible to assure nominal performance. From a diagnostics perspective, a consequence of only two hot fire tests is a limited amount of operating time of the engine during which to assess small changes in the vibration signature rendering trend analysis ineffectual.

The inherent difficulty of comparing different pieces of hardware are mitigated by maintaining a database of previous comparisons between known hardware health and associated vibration characteristics. For example, the variability in vibration characteristics for engines that perform in a nominal fashion can be established with some simple statistics. Additionally, when a correlation has previously been established between documented hardware damage and a unique vibration signature, correlation can be useful in providing an early differentiation between a nominally operating engine and one that contains a defect.

In many methods, the comparison of measurements between different machines is not recommended because of variability in transmission path effects due either to manufacturing tolerances or differences in the instrumentation setup. Also, infant operational characteristics of a machine may not apply across an entire class of machines. The constraints imposed by the methods applied to rocket engine turbomachinery make a comparison between engines impracticable. Rotating machinery can be compared to a baseline operation over an expected operating life measured in years, but life time baseline comparisons are unsuitable for an expendable launch vehicle rocket engine turbopump life, including acceptance testing, that is measured in minutes. While trend analysis is performed from hot fire to hot fire on a typical engine, trend analysis is not applied to compare specific engine parameters to other engines parameters of known operating conditions. While traditional trend analysis may be performed on a single engine, parametric cepstrum analysis has not been accurately used to compare vibration signatures across a class of engines. While cepstrum analysis has been used to perform trend analysis for a particular engine, an easily interpreted parametric database containing cepstrum parameters for both healthy and faulty engines has not been used to provide accurate indication of engine health. These and other disadvantages are solved or reduced using the invention.

SUMMARY OF THE INVENTION

An object of the invention is to provide a test method for rotating machinery.

Another object of the invention is to provide a method for detecting anomalous gear performance in rocket engine turbomachinery during acceptance hot firing.

Yet another object of the invention is to provide a method for detecting anomalous gear performance in rocket engine turbomachinery during acceptance hot firing using two-sided cepstrum analysis.

Still another object of the invention is to provide a method for monitoring rocket engine turbomachinery using two-sided cepstrum analysis for generating a quantitative parameter indicating the performance of the turbomachinery.

A further object of the invention is to provide a method for monitoring rocket engines during hot firing using two-sided cepstrum analysis for generating a quantitative parameter indicating the performance of the turbomachinery relative to a class of like turbomachinery.

Still a further object of the invention is to provide a turbopump vibration diagnostic routine that indicates the nature of a defect by monitoring the change in output characteristics of accelerometers measuring gear box vibrations.

Yet another object of the invention is to provide a method that uses vibration measurements acquired during static firing tests to develop screening parameters that are related to the condition of turbomachinery components.

The invention is a method directed towards a diagnostic procedure for measuring the performance of a machine having periodic movement that can be externally detected through acquired vibration signals. The method is based on a double or two-sided cepstrum analysis that can be applied in the preferred form to steady-state gear box accelerations. The gear box may be part of a rocket engine under hot fire testing. A cepstrum is defined as the inverse discrete Fourier transform of the logarithm of the two-sided autospectral density of the vibration measurements. The vibration measurements used in the analysis are acquired during static hot fire tests from accelerometers mounted on the external surface of the turbopump gear box of the rocket engine. Following the ground tests, the cepstrum analysis is used to provide an indication of turbopumps that have functioned normally and those with anomalous vibration signatures. The effectiveness of the method is demonstrated by comparing analysis results from an engine in good condition with a similar engine that suffered complete gear failure during development testing. The cepstrum method detects anomalous vibration characteristics and provides an indication of the type of defect. Measurement processing provides unique spectral characteristics that indicate the presence of a gear fault.

Measurements acquired during ground testing of a rocket engine are preferably converted into a parameter that is indicative of anomalous behavior of a turbopump gear under test. During ground test operations, measurements from the accelerometers mounted on the exterior of the gear box and a tachometer transducer within a pump housing are acquired on a frequency modulated analog recording tape. Following a series of tests, discrete time periods of data segments are stored in a computer in digital format. The stored measurement data is converted into a single quantitative parameter that may be indicative of anomalous behavior of a gear. The system operates on the series of stored data records, using a digital signal processing system to produce parameters that are stored in a database. These parametric results are used to assess the possibility of the presence and progression of a gear tooth fault in the gear train of the turbopump of the rocket engine.

The stored data records consist of measurements from the gear box accelerometer and outputs from a tachometer transducer. The accelerometer measures the gear box surface acceleration while the tachometer provides a signal that is periodic and is related to the rotation rate of the gear. These discrete data records are acquired at successive times during the ground test operation of the engine and each record is individually analyzed by the digital signal processing system. The digital signal processing system implements a two-sided cepstrum analysis, rotational speed detection and periodic cepstrum peak detection. A two-sided cepstrum analysis calculator converts the time records into a two-sided frequency spectrum using a discrete Fourier transform, an autospectral density calculator and a logarithmic converter, and then converts the two-sided frequency spectrum into a cepstrum vibration signal within a two-sided periodic time domain spectrum. The rotational speed detector converts the periodic tachometer signal into an average gear speed for the time keeping of the data records being analyzed. The peak detector automatically locates, within a specified periodic time range, the peak value of the vibration signal synchronized with the inverse of the calculated average gear speed. This peak value is a cepstrum parameter that is used to assess gear health and is stored in a database. A progressive increase in the value of this cepstrum parameter for a particular engine is indicative of progression of a gear tooth defect. This parameter can be compared with similar values of other like engines that have been previously associated with known gear hardware health. The two-sided cepstrum analysis method detects anomalous vibration signatures and provides a diagnostic indication as to the nature of a defect so that proper corrective actions can be rapidly implemented. Additionally, the cepstrum method provides a quantitative parameter related to a known gear anomaly. This cepstrum parameter is preferably stored in a database and used for comparison to the same parameter obtained from tests on other engines in the same class. The cepstrum analysis is preferably implemented as the inverse discrete Fourier transform of the logarithm of the two-sided autospectral density of the vibration measurements.

A single quantitative cepstrum parameter is generated for indicating gear condition. The cepstrum parameter is automatically calculated from the stored time records. The two-sided cepstrum analysis has the mathematical advantage of increased resolution in the periodic time domain particularly suitable to rocket engine turbomachinery operating at high speeds. The maintained database and quantitative nature of the cepstrum parameter allow for preflight acceptance or rejection of the turbomachinery. The method is particularly effective using data acquired from the exterior of a turbopump gear box during actual ground test operations of rocket engines as a gear condition monitoring method. The measurements acquired on the exterior of the gear box are used to assess the health of the internal rotating gears that can not be inspected after the ground tests and prior to flight. This is advantageous in assessing the risk of catastrophic engine failure during the ascent launch phase of a launch vehicle. If a high risk condition exists, the engine can be rebuilt with a new gear train potentially saving human lives and expensive hardware. The method can be applied on any turbopump with a gear train, and can be adapted to monitor other types of turbopump components, such as bearings, and could also be made to operate in real-time enabling in-flight monitoring of the gear train. Quasi-real-time calculations can be used for monitoring during ground tests for allowing an operator to shut down the test before a gear-induced catastrophic failure.

The method offers an ability to detect and quantify periodic structures in the frequency domain. The ability of the cepstrum parameter to diagnose discrete gear tooth defects is done by comparing the cepstrum parameters for several nominally operating turbopumps to the corresponding values for engines that exhibit catastrophic failure and excessive gear wear and tooth chipping. The mean value and mean plus or minus one sigma values respectively for the cepstrum value for all nominally operating engine liquid oxygen cepstrum parameters are also preferably stored in the database. There may be variation in the value of the cepstrum parameter when different engines are compared to one another. This variation is not unexpected and is a result of engine-to-engine hardware variability. Possible contributors to this variation are residual imbalances in the liquid oxygen shaft or slight gear mesh imperfections. In a preferred form, the method may be used to screen engines against in-flight gear failure during a mission by evaluating the preceding ground test vibration signatures. The primary requirement is to provide an accurate technical evaluation for the unique vibration signature associated with the progression of a defect toward failure. A secondary aspect is to describe this unique vibration signature using the quantitative cepstrum parameter that can be tracked over the operating life of a turbopump that is also stored in a database and compared to other engines. The two-sided cepstrum method is an effective gear box monitoring tool for the preflight testing of a turbopump for engine-to-engine comparisons using the database for comparing hardware health for specific vibration characteristics. These and other advantages will become more apparent from the following detailed description of the preferred embodiment.

DETAILED DESCRIPTION OF THE PREFERRED EMBODIMENT

Figure 1:
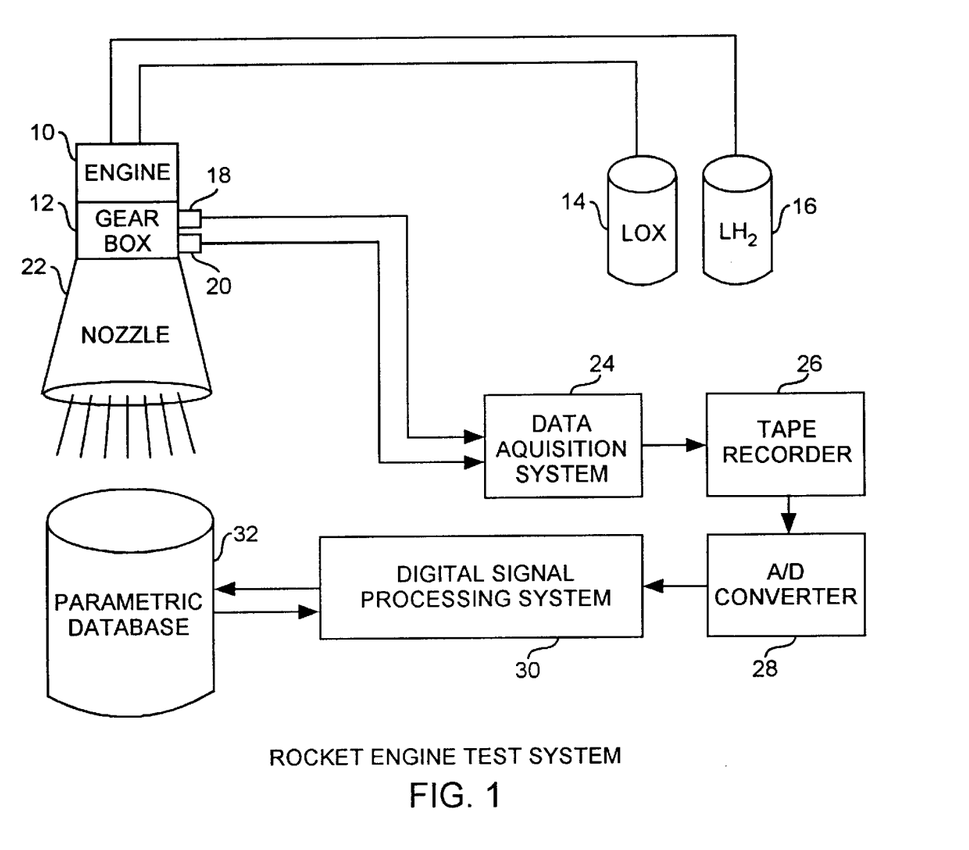
FIG. 1 is a block diagram of a rocket engine test system.

An embodiment of the invention is described with reference to the figures using reference designations as shown in the figures. Referring to FIG. 1, a rocket engine test system is used to monitor an engine 10 having a gear box 12 during static firing testing. The engine is powered by fuel from a liquid oxygen tank 14 and a liquid hydrogen tank 16. The engine 10 is monitored by an accelerometer 18 and a tachometer 20. It is advantageous to place several accelerometers in locations on the exterior of the gear box housing that are characterized by significant system resonances. The accelerometer 18 provides vibration signals corresponding to vibrations of the gear box during the static testing. The engine has a moving portion, not shown, including a rotating shaft and rotating gears. The moving portion provides a tachometer speed signal. During static test firing of the engine 10, exhaust is expended out of a nozzle 22 as the gears in the gear box rotate about the shaft during burning of the fuel from the tanks 14 and 16. The vibration and tachometer speed signals are fed during monitoring to a data acquisition system 24 that amplifies and communicates the vibration and tachometer speed signals respectively from the accelerometer 18 and tachometer 20 for subsequent recording by a tape recorder 26. The tape recorder on playback feeds the recorded vibration and tachometer speed signals to an analog to digital converter 28 that converts the vibration and tachometer speed signals into digital signals and feeds the digital signals to a digital processing system 30 that maintains a parametric database 32.

Figure 2:
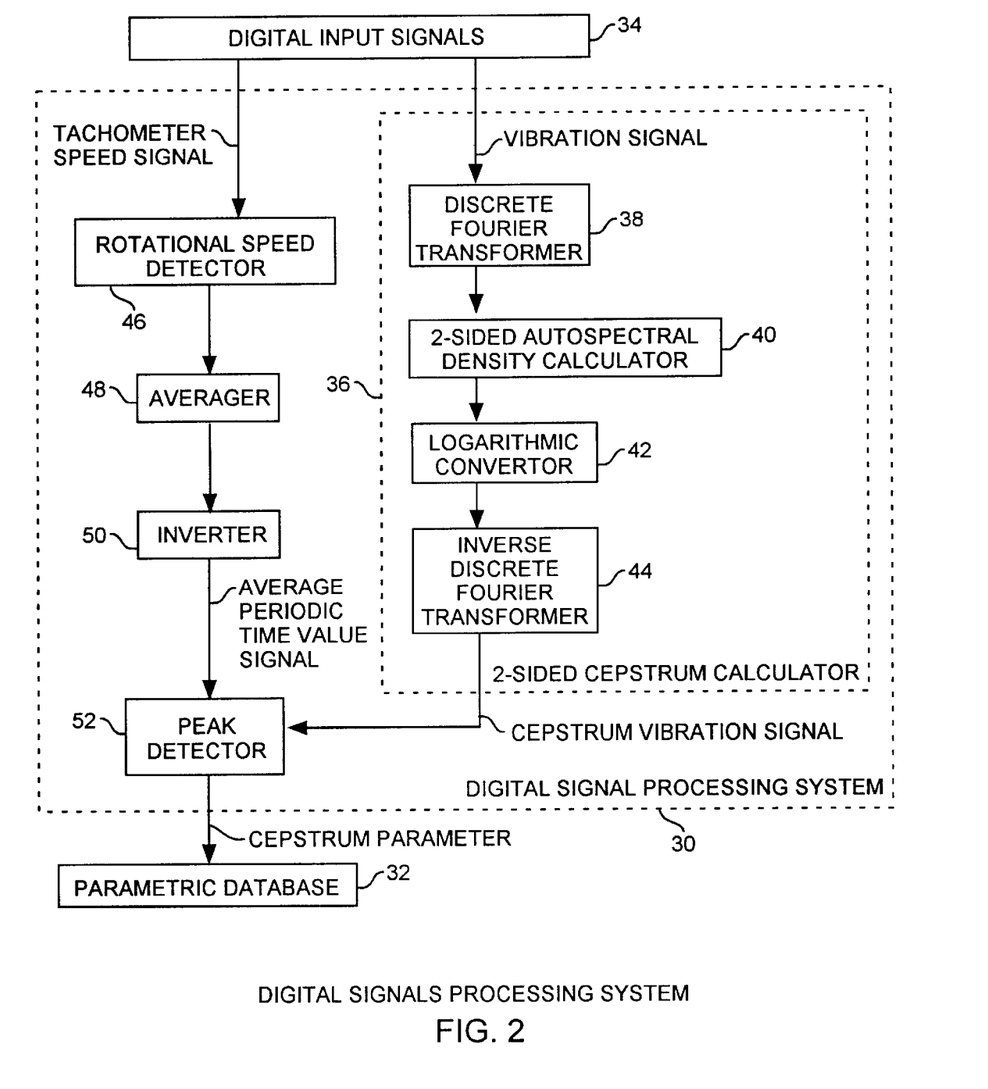
FIG. 2 is a block diagram of a digital signal processing system.

Referring to FIGS. 1 and 2 and more particularly to FIG. 2, the digital signal processing system 30 receives the vibration and tachometer speed digital signals 34 from the converter 28 and stores a cepstrum parameter in the parametric database 32. The digital signal processing system 30 processes the vibration and shaft speed tachometer signals 34 to form a cepstrum parameter for each engine tested of a family of like engines having similar nominal vibration signatures during static test firing. The parametric database stores cepstrum parameters from a plurality of like engines for out-of-family and in-family comparisons. The vibration input signal 34 is received by the digital signal processing system 30 that includes a discrete Fourier transformer 38 providing a Fourier spectrum vibration signal that is then received by a two-sided autospectral density calculator 40 providing an autospectral density vibration signal that is then received by a logarithmic converter 42 providing a logarithmic autospectral density signal that is in turn received by an inverse discrete Fourier transformer 44 providing a cepstrum vibration signal. The discrete Fourier transformer 38 transforms the vibration input signal into the frequency domain. The two-sided autospectral density calculator 40 and the logarithmic converter 42 operate in the frequency domain. The inverse discrete Fourier transformer 44 transforms the logarithmic autospectral density vibration signal into the periodic time domain. The transformers 38 and 44, calculator 40 and converter 42 may be implemented using conventional computer processing.

The digital signal processing system 30 receives the tachometer signal 34 and uses a rotational speed detector 46 for detecting the rotational shaft speed of the gear box for providing a speed signal in Hertz in the time domain that is in turn received by an averager 48 that averages the speed signal in Hertz to provide an average speed signal that is in turn received by an inverter 50 for inverting the speed signal into an average periodic time value signal. The detector 46, averager 48 and inverter 50 form a time-synchronized processing path in the digital signal processing system 30 that operates in parallel with the two-sided cepstrum calculator 36. The average periodic time value signal and the cepstrum vibration signal are received in synchronism by a peak detector 52 that detects the peak of the cepstrum vibration signal at the average periodic time value to provide the cepstrum parameter that is then stored in the parametric database 32 for out-of-family and in-family comparisons of monitored engines. The cepstrum parameter is developed by processing vibration and periodic measurements during steady-state test conditions. These measurements are acquired on the exterior of the gear box and thus, vibrations induced by small defects in the internal components are often hidden within the high amplitude signal that is inherent in normally operating rocket engines.

Figure 3A:
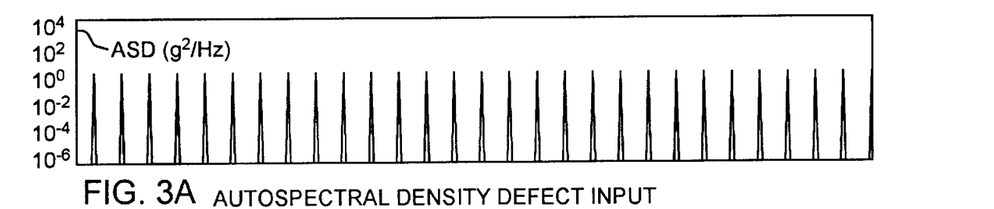
FIG. 3A is a graph in the spectral domain of an autospectral density of a defect input.
Figure 3B:
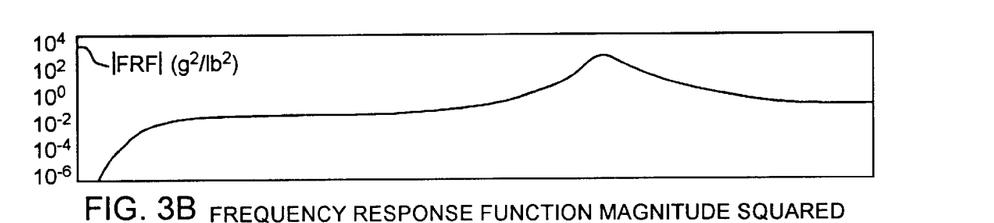
FIG. 3B is a graph in the frequency domain of a frequency response function with a square magnitude.
Figure 3C:
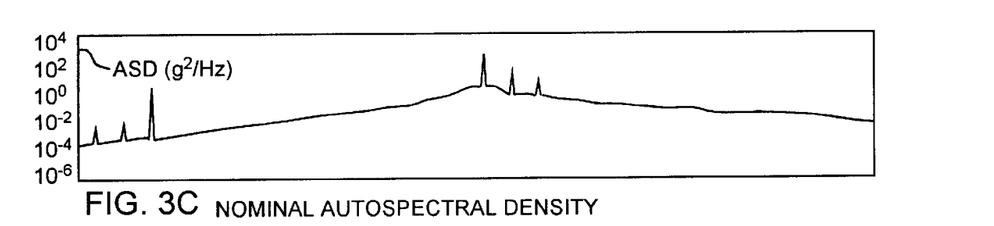
FIG. 3C is a graph in the spectral domain of an autospectral density of a normal gear vibration response.
Figure 3D:
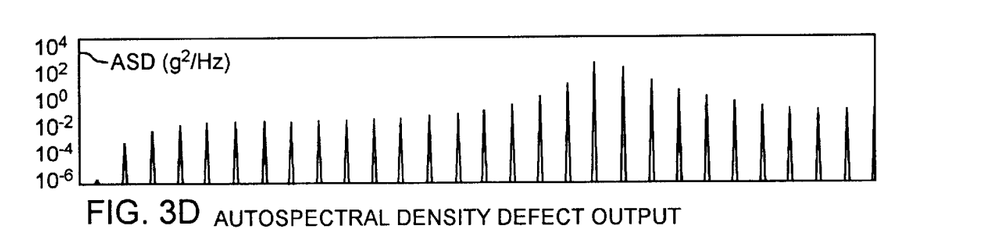
FIG. 3D is a graph in the spectral domain of an autospectral density of a defect output.

Referring to FIGS. 3A through 3E, the cepstrum method uses frequency domain signal evaluations. The autospectral density of the hidden defect input is revealed as energy spikes shown in FIG. 3A located at the fundamental and integer multiples of the liquid oxygen shaft rotation rate. A single degree-of-freedom transfer function magnitude squared is shown in FIG. 3B for modeling machine operation that has superimposed resonance responses shown as a nominal autospectral density in FIG. 3C. The autospectral density of the single degree-of-freedom oscillator model of the defect is shown in FIG. 3D. The defect component can be superimposed upon the inherent nominal autospectral density response of a healthy system turbopump for generating an inherent and defective composite autospectral density shown in FIG. 3E as an autospectral density of the machine prior to failure.

Figure 4A:
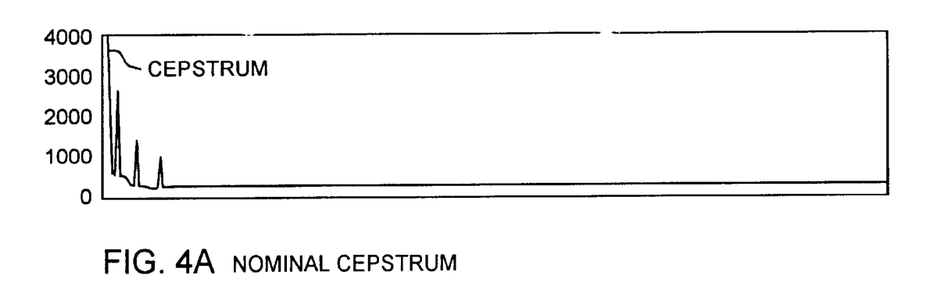
FIG. 4A is a graph in the time domain of a nominal cepstrum response in the cepstrum domain.
Figure 4B:
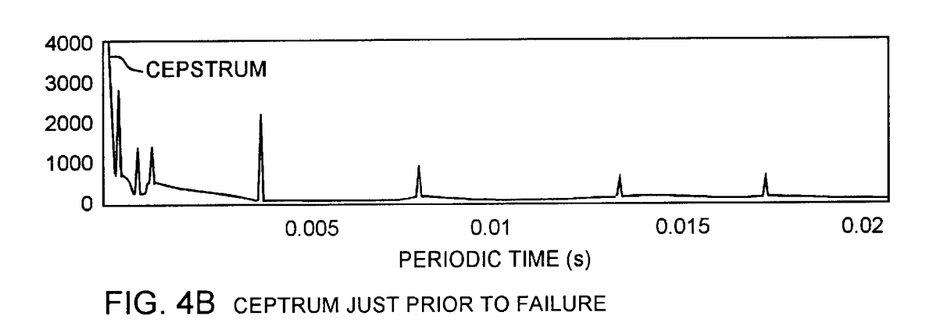
FIG. 4B is a graph in the time domain of a cepstrum response in the cepstrum domain prior to failure of the gears under test.
Figure 5A:
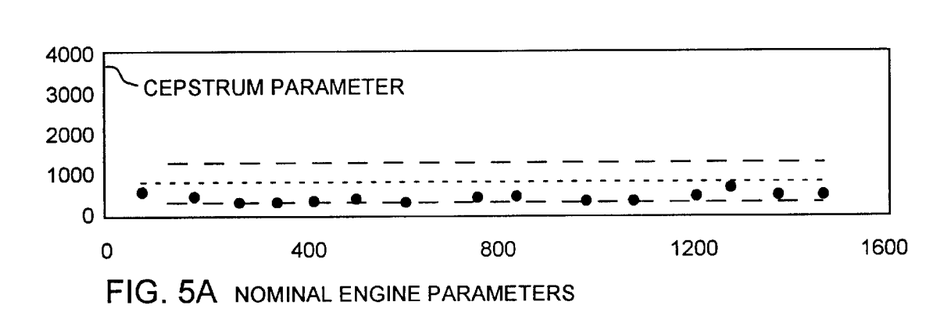
FIG. 5A is a graph of nominal engine parameters during hot fire testing run time.
Figure 5B:
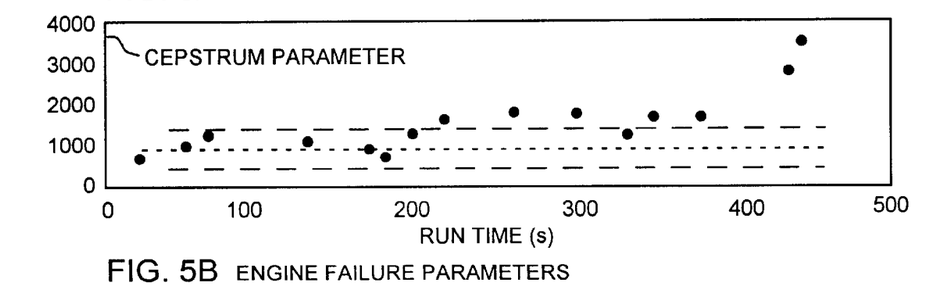
FIG. 5B is a graph of engine failure parameters during hot fire testing run time.

Referring to all of the Figures, and more particularly to FIGS. 4A through 5B, the method computes the cepstrum for the engine under test. A nominal cepstrum signal has some peaks during normal operation as shown in the periodic time domain in FIG. 4A. A cepstrum just prior to failure has additional peaks at multiples of the fundamental periodic time as shown in FIG. 5C. The method generates from the cepstrum vibration signal the cepstrum parameters at various points during a test as shown in FIG. 5A for a nominal operating engine showing the cepstrum parameter to be within a variation band of in-family nominal operating engines of a class of engines. An engine with a defect will generate cepstrum parameter values outside the variation band as an out-of-family comparison during the test as shown in FIG. 5B.

Referring to all of the figures, the two-side cepstrum analysis is based on autospectral density processing. A representative autospectral density plot of the vibration response is shown in the FIG. 3C corresponding to a 4.0 second time frame and data acquired at a rate, for example, of 25K samples per second. This autospectral density plot is from data acquired during the final static firing of an exemplar healthy engine that operated normally during acceptance tests and later performed successfully during a flight. The autospectral density is calculated using the discrete Fourier transformer 30 preferably using thousands of data points, for example 8200 data points, and a Hanning window to suppress sidelobe leakage. For example, the difference between the autospectral density for a nominally operating turbopump and one that is several seconds away from catastrophic failure of the gear is indicated by multiple peak growth in the frequency domain. Data acquired at a rate of at 25K samples per second during the final acceptance test firing of a production engine that operated nominally during the acceptance tests and later performed successfully during flight is shown in FIG. 3C for comparison. Several distinct peaks can be seen in the low frequency regime that are a result of known forced system responses due to shaft rotation. Depending on the construction of the turbopump, other forced responses due to rotating components or flow-induced vibrations are often observed. In the case of the exemplar healthy engine, the autospectral density did not change significantly over the series of hot runs performed. The results from testing the exemplar healthy engine may be compared to results obtained from an exemplar defective engine that exhibited a failure of the liquid oxygen gear at the end of a series of static firings. Subsequent to the failure of the exemplar defective engine, analysis and laboratory testing attributed the failure to a fatigue crack that progressed from the root of a single tooth on the liquid oxygen gear. Thus, the method focuses a defect source mechanism that correlates the vibration induced by an exemplar discrete gear tooth fault to the unique spectral characteristics as shown by example in FIG. 3E that appear in the exemplar defective engine. A qualitative assessment of the engine health can sometimes be made by visual inspection of the autospectral density. In the case of discrete gear tooth defects, the damage can often be seen in the frequency domain as a family of spectral peaks spaced at integer multiples of the speed of the shaft upon which the faulty gear tooth is located. In the case of the gear failure, the defect source mechanism is a system resonant amplification of short-duration impulses spaced at time intervals corresponding to the disturbance induced by a gear defect.

A simple input-output model can be used to indicate the source mechanism for the spectral characteristics observed on the defective engine with a gear tooth fault. Measurements obtained from the accelerometer mounted on the exterior of a turbopump gear box are used for development of screening criteria for the liquid oxygen gear in a particular rocket engine. Processing random vibrations is based on data records. Discrete time periods for vibration accelerations are expressed in the time domain by the data record x(t) that is divided into $n_d$ contiguous segments of length T. Each record segment $x_m(t)$ can be represented in digital terms, with a sampling interval of $\Delta t$, by N data values $\{x_{mn}\}$ where n=0, . . . , N−1, and m=1, . . . . $n_d$. Preferably, a Hanning window with a mean square correction factor is now applied to the data record. In the transformer 38, the discrete Fourier components of the mth record are defined by a Fourier transform equation.

$$X_m(f_k) = \Delta t \sum_{n=0}^{N-1} x_{mn} e^{-j2\pi kn/N}, k = -\frac{N}{2}+1, \ldots, \frac{N}{2}$$

The terms $X_m$ are the discrete Fourier components of the mth record. The Fourier transform equation is deterministic at the discrete frequencies $f_k$=k/T=k/N$\Delta$t. The two-sided autospectral density is then defined by a two-sided autospectral density equation. The $x_m(t)$ data records can then be assessed in the frequency domain using the two-sided autospectral density equation.

$$S_{xx}(f_k) = \frac{1}{n_d T} \sum_{m=1}^{n_d} |X_m(f_k)|^2, k = -\frac{N}{2}+1, \ldots, \frac{N}{2}$$

An autospectral density may be presented graphically as a one-sided autospectral density. The one-sided autospectral density equation can be obtained from the two-sided autospectral density. The one-sided autospectral density, $G_{xx}(f_k)$ is defined by a one-sided autospectral density equation.

$$G_{xx}(f_k)=S_{xx}(f_k),\ k=0,\ \&,\ G_{xx}(f_k)=2S_{xx}(f_k),\ k=1,\ldots,N/2$$

Measurements obtained from a particular accelerometer mounted on the exterior of a rocket engine turbopump are used to aid in the development of screening criteria for an engine. The accelerometer output is a function of the various vibration-producing mechanisms within the gear box. Therefore, this machine can be described using a simple multiple input and single output model. For a multiple input and single output model, there are q transfer functions for the constant parameter linear systems $H_i(f)$, i=1, . . . q, q inputs $x_i(t)$, i=1, . . . , q, and one output y(t). There is also an output noise term n(t) that accounts for all deviations from the ideal model, which may be due to unmeasured inputs, nonlinear operations, non-stationary effects and instrument noise. When n(t) is uncorrelated with each $x_i(t)$, the frequency domain relation between the inputs and the output is defined by the frequency domain equation.

$$Y(f) = \sum_{i=1}^{q} H_i(f)X_i(f) + \hat{N}(f)$$

The terms $X_i$, Y and $\hat{N}$ can be determined from $x_i(t)$, y(t) and n(t) using the Fourier transform equation. In a general case of arbitrary inputs, the relationship between the output autospectral density and the i=1, . . . , q input autospectral densities is defined by a generalized autospectral density equation.

$$S_{yy}(f) = \sum_{i=1}^{q} \sum_{k=1}^{q} H_i^*(f)H_k(f)S_{ik}(f) + S_{nn}(f)$$

The term $S_{ik}(f)$ is the cross-spectral density function of $x_i(t)$ and $x_k(t)$, $H^*_i$ is the conjugate transpose of $H_i$ and $S_{nn}(f)$ is the autospectral density of the noise. A multiple input and single output system with a defect has an output autospectral density that is the summation of contributions from inputs $x_i(t)$, i=2, . . . , q, due to healthy system operation and a single input $x_i(t)=x_d(t)$ that is the result of some defect in the system. This system is approximated by assuming that the input arising from the defect is uncorrelated with the inputs due to healthy system performance. The system approximation indicates that $S_{di}(f)=S_{id}(f)=0$ for i=2, . . . , q and can be used for deriving an $s_{yy}(f)$ composite autospectral density equation.

$$S_{yy}(f) = \sum_{i=2}^{q} \sum_{k=2}^{q} H_i^*(f)H_k(f)S_{ik}(f) + S_{nn}(f) + |H_d(f)|^2 S_{dd}(f)$$

The term $S_{dd}(f)$ is the input autospectral density resulting from a defect in the system. The complete autospectral density equation can be rewritten by dividing the equation into two components, such that, $S_{yy}(f)=S_{yy}^h(f)+S_{yy}^d(f)$ wherein $S_{yy}^h(f)$ represents a healthy component plus noise and $S_{yy}^d(f)$ represents a defect component. The part of the total output autospectral density resulting from noise and healthy system operation is defined by a $S_{yy}^h(f)$ healthy autospectral density equation and a $S_{yy}^d(f)$ defect autospectral density equation.

$$S_{yy}^h(f) = \sum_{i=2}^{q} \sum_{k=2}^{q} H_i^*(f)H_k(f)S_{ik}(f) + S_{nn}(f)$$

$$S_{yy}^d(f)=|H_d(f)|^2 S_{dd}(f)$$

The output autospectral density is a summation of contributions from a normal healthy system operation with noise and the contribution from the defect in the system., The $S_{dd}(f)$ autospectral density of the defect input is amplified or attenuated by the magnitude of an associated transfer function $|H_d(f)|^2$ that indicates a relatively low-level input phenomenon arising from a minor defect that can be detected in the vicinity of a system resonance. In the case of a defect in a gear tooth, detecting the defect anomaly using vibration measurements acquired on the pump housing is difficult because the vibration level due to the small defect is often masked by normal turbopump response at the fundamental defect frequency. When the force induced by a defect in a gear tooth is characterized by a short-duration impulse, the resulting energy will be spread across a wide region of the output spectrum. The excitation impulse induced by the gear tooth defect excites system resonances, and hence the excitation impulse is amplified across a wide frequency range. The turbomachinery system functions as a mechanical amplifier for detecting the presence of the impulse. When the response to the impulse is spread across a wide spectrum, detection techniques can be focused in frequency regimes where the defect is not masked by normal vibratory response of the pump. An additional consequence of the system resonance amplification is that the signal-to-noise ratio for the output due to the defect is increased in the vicinity of the resonance.

The method determines the nature of a defect by monitoring the change in output characteristics of the accelerometer. In this case, that means being able to relate a change in $S_{yy}(f)$ to a known defect condition. In the multiple input and single output model, the input and output contributions i=2, . . . , q are associated with normal system operation. Any major deviation in the total output, or $S_{yy}(f)$, will be a result of the single input and single output defect system (i=1=d) described in the frequency domain.

In order to understand the transmission path effects between the defect gear location and the accelerometer, system identification methods such as tap tests and analytical analyses including the gear box could help in estimating the transfer function $H_d(f)$ associated with the defect single input, single output system. The simplest single degree-of-freedom model possible is used to characterize the defect single input and single output system. The single degree-of-freedom model is not a physical representation of the turbopump, but rather, is a means by which the transfer function associated with the defect can be mathematically described. This single degree-of-freedom model is governed by an oscillator differential equation.

$$\ddot{y}_d + 2\varsigma(2\pi f_n)\dot{y}_d + (2\pi f_n)^2 y_d = \frac{1}{m}F$$

The term F is the force input induced by the defect and $\ddot{y}_d$ is the defect contribution to the total response acceleration. The transfer function relating the input and output is characterized by the natural frequency $f_n$, the coefficient of critical damping ç and the system mass m. An estimate of the natural frequency that best describes the physical system is made by performing a waterfall analysis of the shutdown time transient. The transient can be presented in a max-mean-min format that provides the envelope and mean of the time history within several millisecond time intervals. A contour waterfall plot of spectral density for this transient can indicate the regions representing the highest spectral density. When the engine is shut down, the high-amplitude forced responses due to shaft rotations and flow-induced vibration are no longer evident. Following the shutdown, significant vibration at system resonances can still be observed in the regions of high frequency, such as 4200 Hz, and, to a lesser extent, at other frequencies. Due to the relatively wide-band peak at 4200 Hz that appears consistently in the shutdown waterfall plots, regardless of engine operating condition, the 4200 Hz resonance is a gear box housing structural resonance as indicated by the measured output autospectral density at all observed operating conditions that are characterized by a shape containing a wideband maximum at 4200 Hz. Therefore, this structural resonance may be in the transmission path between all mechanical and flow-induced inputs and the output as also demonstrated by tap tests of limited scope in which locations on the turbopump exterior are impacted with an instrumented force hammer. Regardless of impact location, the frequency response function relating the acceleration response on the gear box to the short duration force impulse is consistently characterized by a peak at a frequency, such as 4200 Hz, that dominated the spectrum. Thus, a value of 4200 Hz is used for the natural frequency of the single degree-of-freedom defect model. The frequencies observed in the waterfall contours are actually the damped natural frequencies of the system. However, at critical damping values of less than 10%, the difference between damped and undamped natural frequencies is negligible. A value of ç=0.04 may be used for this system based on curve-fitting the test results with ground test results. Values for ç from 0.01 to 0.10 are typical to best fit the actual data. The single degree-of-freedom transfer function magnitude squared $|H_d(f)|^2$ is defined for a unit mass of one pound and is shown in FIG. 3B.

A liquid oxygen gear containing a tooth defect induces a short-duration force impulse once per revolution of the liquid oxygen shaft. Mathematically, the forcing function is defined by a forcing function equation.

$$F(t) = A\delta\left(t - \frac{n}{f_{LOX}}\right)$$

The term A is the amplitude of the force impulses, $\delta$ is the dirac delta function, n are integers, and $f_{LOX}$ is the frequency of rotation of the liquid oxygen shaft. This input forcing function may be described for a value of $f_{LOX}$=241 Hz and A=70 pounds.

The autospectral density of this defect input $S_{dd}(f)$ indicates that the energy is spread across the entire frequency spectrum and is contained in spikes located at the fundamental and integer multiples of the liquid oxygen shaft rotation rate as shown in FIG. 3A. The defect component is related to the growth in the frequency domain of the spectral components at fundamental and integer multiples of the defect frequency. The response of the single degree-of-freedom oscillator to this input is then governed by a forced oscillator differential equation.

$$\ddot{y}_d + 2\varsigma(2\pi f_n)\dot{y}_d + (2\pi f_n)^2 y_d = \alpha\delta\left(t - \frac{n}{f_{LOX}}\right)$$

The term $\alpha$ is a scale factor, where $\alpha$=A/m can be thought of as a pseudo-acceleration term that depends on the amplitude of the force impulses and the unknown system constant associated with the reciprocal of the mass of the single degree-of-freedom. The response of the single degree-of-freedom oscillator for a value of $\alpha$=70 gs can be represented in the time domain. The recurring damped oscillatory response at the natural frequency, for example 4200 Hz, has an impact spacing of $1/f_{LOX}$. Using the $S_{yy}{}^d(f)$ defect autospectral density equation, the output autospectral density due to the defect in the frequency domain $S_{yy}{}^d(f)$ is the product of the input defect autospectral density and the associated transfer function magnitude squared. While initially counterintuitive, the transfer function magnitude squared indicates that the contribution to the output spectrum due to the defect is smallest at the fundamental defect frequency and largest at significantly higher frequencies near the system resonance. The change in $S_{yy}(f)$ due to a defect in a liquid oxygen gear tooth will be characterized by an increase in the spectrum at fundamental and integer multiples of the liquid oxygen shaft rotation rate. Furthermore, the increase at these liquid oxygen harmonics will not be uniform across the spectrum, but rather will be amplified and or attenuated by the transfer function associated with the defect.

The consequence of the appearance of the defect at integer multiples is that the defect signal-to-noise ratio will be greater in the regions surrounding the system resonance than in the lower frequency range. The signal to noise ratio will be smallest at the fundamental frequency of the defect and the harmonics of the defect frequency will be most evident near the system resonance. The autospectral density of the single degree-of-freedom oscillator model of the defect, for example at $\alpha$=100 gs as shown in FIG. 3D, can be superimposed upon the healthy system turbopump autospectral density as shown in FIG. 3C. When the single degree-of-freedom oscillator response is the contribution from the defect to the total output of the accelerometer, the peaks of the defect contribution are larger than the healthy system autospectral density in the regions in the vicinity of the structural resonance where the liquid oxygen gear harmonics first appear in the actual engine containing the gear fault. Additionally, in order for a particular mechanical or flow-induced input to be amplified by the resonance frequency, for example 4200 Hz, the input spectrum must contain energy at that resonant frequency. Many of the normal operating inputs associated with the turbopump contain significant energy in the lower frequency regime. However, the energy content of normally operating turbopump components may not be as large in the higher frequency regime near the resonance frequency. On the other hand, the short duration, potentially low amplitude inputs that characterize the disturbance induced by a discrete gear tooth defect will be characterized by a spectrum with significant energy content at higher frequencies. When approaching a theoretical dirac delta input, the energy content is equally distributed across the entire frequency range and is contained in spikes at the fundamental and integer multiples of the defect frequency that effectively identifies the defects near the resonance because the defects are not hidden or masked by the innputs due to a nominally operating engine but may be masked at lower frequencies. Hence, the gear box acceleration outputs should be processed over a frequency range that includes system resonant frequencies for identifying faults. Data analysis carried out below the resonance reduces the ability to detect impending failure.

Figure 3E:
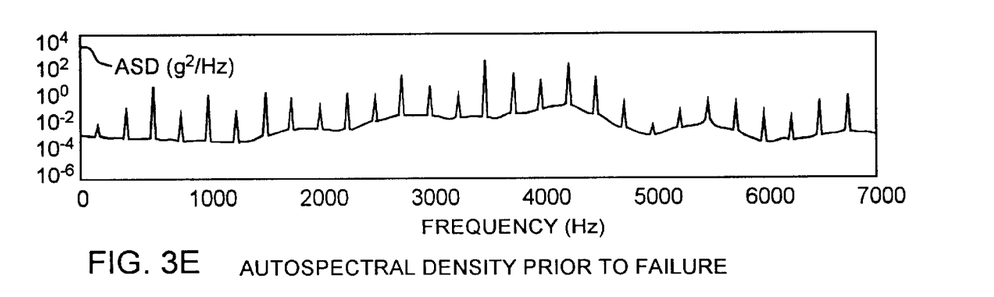
FIG. 3E is a graph in the spectral domain of an autospectral density prior to failure of the gears.

A gear defect that occurred during actual ground test static firings was used to assess the defect model. An exemplar engine is characterized by a complete failure of the liquid oxygen gear at the end of static firing. It is postulated that as engine operating time increases, a local liquid oxygen gear tooth defect may grow until the gear failed. As the defect grows, the force induced by the defect consequently increases indicating that, as the defect becomes more severe, the amplitude A of the force impulses defined and thus, the scale factor $\alpha$ becomes larger. The rotation rate, and thus the defect impulse rate, of the liquid oxygen shaft is indicated by the autospectral density plots. The defect portion of the response is added to the autospectral density of the normally operating system to get the total autospectral density of the output for the exemplar defect engine as shown in FIG. 3E. The total can be compared to the autospectral density for a normally operating engine as shown in FIG. 3C. There is an increase in amplitude of the spectral components corresponding to integer multiples of the defect frequency as engine operating life increases during the static firing. The initial and most pronounced changes occur not at the fundamental defect frequency, but rather at higher frequencies near the system resonance identified using the waterfall contour plot. The spectral lines corresponding to the fundamental frequency of liquid oxygen shaft rotation and the lowest harmonics do not substantially increase until failure.

The multiple input and single output model indicates the physics of the defect growth process. The multiple input and single output model involving an ideal delta function force and a single transmission resonance at a resonance leads to an overestimation of defect-based harmonics above the resonant frequency range relative to those harmonics in the lower frequency range. The overestimation from the use of a single degree-of-freedom model may lead to an overemphasis of the frequency response function associated with the defect in the region near the resonance. The defect forcing function may have a very short, yet finite pulse duration rather than an ideal delta function leading to a frequency spectrum characterized by spectral components with diminished amplitudes at frequencies above the resonance. Nevertheless, the multiple input and single output model does lead to results that provide good correlation with the actual data.

The cepstrum method provides a single quantitative parameter that is related to the presence and growth of a discrete gear tooth defect. The cepstrum is used to enhance detection of a vibration signature. While the change in visual characteristics of the autospectral density is helpful in providing a qualitative indication of a potential defect, it is desirable to quantify the degree of abnormality of the vibration signature. This abnormality can be quantified using a single cepstrum parameter that can be stored in a database and used to make comparisons between engines that have operated normally and those engines that have exhibited known defects. Furthermore, by virtue of the previous correlation between the growth of the harmonics in the spectral domain and a defect in the liquid oxygen gear tooth, this cepstrum parameter is related directly to the evolution of a liquid oxygen gear fault. The existence of an easily identified spike in the cepstrum plots for the exemplar defect engine corresponds to a periodic time of $\tau_{LOX}=1/f_{LOX}$ and is shown in FIG. 4B, as compared to the cepstrum plot corresponding to a normal healthy engine as shown in FIG. 4A. The cepstrum plots indicate that the spike, for example at the periodic time of approximately 0.004 as shown in FIG. 4B, is related to the growth in the frequency domain of the spectral components at fundamental and integer multiples of the defect frequency.

In many cases of machinery analysis, fault development appears in the frequency spectrum as a family of harmonics or sidebands that are spaced at multiples of the fundamental frequency of the disturbance induced by the defect. The cepstrum method is used to detect and quantify these harmonics. By performing a cepstrum calculation, the strength of an entire family of harmonics is expressed by the cepstrum parameter in the cepstral domain to quantify the severity of the defect. The defect evolution can be monitored using the magnitude of the cepstrum parameter. The cepstrum can be used to precisely determine the frequency spacing of a periodic structure. The cepstrum can also be used to automatically indicate the appearance of harmonics. While several cepstrum implementations may be used, the preferred form of the two-sided cepstrum process is defined by a $C_{yy}$ two-sided cepstrum equation.

$$C_{yy}(\tau_n) = \mathcal{F}^{-1}\{\log[S_{yy}(f_k)]\} = \Delta f \sum_{k=-\frac{N}{2}+1}^{\frac{N}{2}} \{\log[S_{yy}(f_k)]\} e^{\frac{j2\pi k n}{N}},$$

$$n = -\frac{N}{2}+1, \ldots, \frac{N}{2}$$

At the discrete periodic times $\tau_n=n/N\Delta f$, the term $\Delta f$ is the line spacing of the autospectral density and $\mathcal{F}^{-1}$ denotes the inverse discrete Fourier transform operator. The cepstrum differs from the autocorrelation function by a base ten logarithmic conversion of the autospectral density before the inverse discrete Fourier transform is performed. Because the cepstrum is the inverse discrete Fourier transform of a function of frequency, the independent variable $\tau_n$ is actually time. However, the parameter $\tau_n$ is effectively a delay time as for the auto-correlation function. Therefore, $\tau_n$ is referred to as periodic time. When the logarithm of the autospectral density $\log|S_{yy}(f)|$ is periodic in nature with a frequency spacing of $f_p$, the contribution of all of the harmonics will be concentrated in the single cepstrum parameter $C_{yy}(\tau_p)$ at a value of $\tau_p=1/f_p$. When the logarithm of the autospectral density is periodic in nature with a frequency spacing of $f_{LOX}$, the contribution of all of the harmonics will be concentrated in the single cepstrum component $C_{yy}(\tau_{LOX})$ at a value of $\tau_{LOX}=1/f_{LOX}$. Whenever the output cepstrum parameter is presented graphically however, the magnitude of only one side is shown. The cepstrum parameter is a real-valued two-sided even function that is computed using the two-sided autospectral density equation. The two-sided cepstrum as defined using the two-sided autospectral density equation, provides a resolution increase, as compared to the one-sided cepstrum, of a factor of two while the characteristics of the autospectral density remain unchanged. The application of the cepstrum is applied to high operating speeds of the turbopump and the wide range of component defect frequencies of interest. The magnitude of the two-sided cepstrum parameter $|C_{xx}(\tau_n)|$ is used to identify and track the gear fault. In order to establish a baseline, the cepstrum corresponding to the healthy turbopump autospectral density is acquired with an absence of an identifiable peak at the periodic time.

The cepstrum method provides insight into the nature of a defect as well as indicating that a problem exists. More specifically, the periodic time at which the cepstrum parameter grows is directly related to the frequency of the particular shaft containing the defect. When there is a defect in a gear tooth on a shaft other than the shaft of liquid oxygen pump, a similar growth of the cepstrum parameter associated with the inverse of the rotation of that shaft would occur. In this sense, the cepstrum method is not only a detection technique, but also an effective diagnostic tool. Based on the exemplar acquired data, the cepstrum parameter appears to increase with operating time, as shown in FIG. 5B, in engines containing liquid oxygen gear defects while the same parameter remains relatively constant in nominally operating pumps, as shown in FIG. 5A. Additionally, in the cases of documented hardware damage, the liquid oxygen cepstrum parameter is larger than the corresponding values for nominally operating turbomachinery. The cepstrum method is capable of detecting anomalous gear behavior in a particular rocket engine turbopump. The cepstrum method generates a cepstrum parameter that can be stored in a database. A defect source mechanism produces an appearance of higher order harmonics inherent in an autospectral density for a turbopump with a faulty gear. This source mechanism produces similar appearances of harmonics in other defective turbopump gears by tracking the cepstrum component corresponding to the inverse of the rotation rate of the shaft supporting the gear. Defects are detected earlier in frequency regimes corresponding to known system resonances than at the fundamental defect frequency. The method is an effective defect screening method. Those skilled in the art can make enhancements, improvements, and modifications to the invention, and these enhancements, improvements, and modifications may nonetheless fall within the spirit and scope of the following claims.

What is claimed is:

1. A method of generating a cepstrum parameter from a vibration signal and a periodic speed signal from a moving part of a machine, the method comprising the steps of:

receiving the vibration signal and the periodic speed signal from the moving part of the machine, transforming the vibration signal into a Fourier spectrum vibration signal, calculating a two-sided autospectral density from the Fourier spectrum vibration signal, logarithmically converting the two-sided autospectral density into a logarithmic autospectral density, inverse transforming the logarithmic signal into a cepstrum vibration signal, generating a time signal from the periodic speed signal, and determining the cepstrum parameter from the cepstrum signal at a time indicated by the time signal.

2. The method of claim 1 wherein, the vibration signal is recorded as a data record x(t) divided into $n_d$ contiguous segments of length T with each record segment $x_m(t)$ represented in digital form with a sampling interval of $\Delta t$, by N data values $\{x_{mn}\}$ where n=0, ..., N−1 and m=1, ..., $n_d$ where discrete Fourier components of an mth record are defined for discrete frequencies $f_k$=k/T=K/N$\Delta$t by an $X_m$ Fourier transform equation of $$X_m(f_k) = \Delta t \sum_{n=0}^{N-1} x_{mn} e^{\frac{-j2\pi kn}{N}}, k = -\frac{N}{2}+1, \ldots, \frac{N}{2}$$

where $X_m(f_k)$ is the Fourier spectrum vibration signal.

3. The method of claim 1 wherein, the two-sided autospectral density is calculated from a two-sided autospectral density equation of $$S_{xx}(f_k) = \frac{1}{n_d T} \sum_{m=1}^{n_d} |X_m(f_k)|^2, k = -\frac{N}{2}+1, \ldots, \frac{N}{2}$$

where $S_{xx}(f_k)$ is the two-side autospectral density.

4. The method of claim 1 wherein, the logarithmic autospectral density is logarithmically converted from the the two-side autospectral density, the logarithmic autospectral density being a logarithm in base ten of the two-side autospectral density using a logarithmic equation of $\log[S_{xx}(f_k)]$ for k=−(N/2)+1, ..., N/2.

5. The method of claim 1 wherein, the logarithmic autospectral density is inversely Fourier transformed into the cepstrum vibration signal using a two-sided cepstrum equation of $$C_{yy}(\tau_n) = \mathcal{F}^{-1}\{\log[S_{yy}(f_k)]\} = \Delta f \sum_{k=-\frac{N}{2}+1}^{\frac{N}{2}} \{\log[S_{yy}(f_k)]\} e^{\frac{j2\pi kn}{N}},$$

$$n = -\frac{N}{2}+1, \ldots, \frac{N}{2}$$

where $C_{yy}(\tau_n)$ is the cepstrum vibration signal.

6. The method of claim 1 wherein the time signal generating step comprises the steps of:

detecting a movement speed signal from the periodic speed signal, averaging the movement speed signal into an average movement speed signal, and inverting the average movement speed signal into the time signal.

7. The method of claim 1 wherein, the cepstrum vibration signal is in a periodic time domain, the time signal is a value identifying a point in the periodic time domain for sampling detection a value of the cepstrum vibration signal for generating the cepstrum parameter.

8. A method of determining a defect in a machine having a moving part, the method comprising the steps of:

operating the machine during run time for producing vibrations from the moving part, the moving part moving at a periodic rate, receiving vibration signals from the vibrations, receiving tachometer signals indicating the periodic rate of the periodic movement of the moving part, acquiring the vibration signals and the tachometer signals, storing the vibration and tachometer signals, retrieving the vibration and tachometer signals, converting the vibration and tachometer signals into digital form and into converted vibration signals and converted tachometer signals, respectively, transforming the converted vibration signals into a Fourier spectrum vibration signal, calculating a two-sided autospectral density signal from the Fourier spectrum vibration signal, logarithmically converting the two-sided autospectral density signal into a logarithmic autospectral density signal, inverse transforming the logarithmic autospectral density signal into a cepstrum vibration signal, detecting a speed signal from the converted tachometer signals, averaging the speed signal into an average speed signal, inverting the average speed signal into an average periodic time value signal, detecting the cepstrum vibration signal at the average periodic time value signal for providing a cepstrum parameter for the machine, repeating all of the steps for a plurality of like machines for defining a base line, and determining when the cepstrum parameter for the machine is outside the base line for indicating the defect of the machine.

9. The method of claim 8 wherein, the vibration signals and the tachometer signals are synchronized in time during the run time, the cepstrum vibration signal and the average periodic time value signal are synchronized in time, and the average periodic time value signal has an average periodic time value for locating the cepstrum parameter as a value of the cepstrum vibration signal at a time point corresponding to an instance in time during the run time.

10. The method of claim 8 wherein, the vibration signals and the tachometer signals are synchronized in time during the run time, the cepstrum vibration signal and the average periodic time value signal are synchronized in time, and the average periodic time value signal has a average periodic time value for locating the cepstrum parameter as a value of the cepstrum vibration signal at a time point corresponding to an instance in time during the run time, the method further comprising the step of:
repeating all of the method steps a plurality of times for generating a respective plurality of cepstrum parameters for the machine.

11. The method of claim 8 wherein, the vibration signals and the tachometer signals are synchronized in time during the run time, the cepstrum vibration signal and the average periodic time value signal are synchronized in time, the average periodic time value signal has a average periodic time value for locating the cepstrum parameter as a value of the cepstrum vibration signal at a time point corresponding to an instance in time during the run time, the method further comprising the steps of:
repeating all of the steps a plurality of times for generating a set of cepstrum parameters for the machine, and comparing the test set of cepstrum parameters to the base line for determining when the test set of cepstrum parameters are within the base line for indicating a proper operation of the machine and for determining when the test set of cepstrum parameters are outside the base line for indicating the defect of the machine.

12. The method of claim 8 wherein, the vibration signals and the tachometer signals are synchronized in time during the run time, and the cepstrum vibration signal and the average periodic time value signal are synchronized in time, and the average periodic time value signal has a average periodic time value for locating the cepstrum parameter as a value of the cepstrum vibration signal at a time point corresponding to an instance in time during the run time, the method further comprising the steps of:
repeating all of the method steps a plurality of times for generating a respective plurality of cepstrum parameters for the machine as a test set of cepstrum parameters, repeating all of the method steps a plurality of times for the machine for generating a respective plurality of cepstrum parameters through the run time as a test set of cepstrum parameters, and for generating a plurality of cepstrum parameters as a plurality of sets of cepstrum parameters respectively for the plurality of like machines for generating the base line, and comparing the test set of cepstrum parameters to the base line of cepstrum parameters, the base line of cepstrum parameters indicating a healthy operating range for determining when the test set of cepstrum parameters are within the base line for indicating a proper operation of the machine and for determining when the test set of cepstrum parameters are outside the base line for indicating a defective operation of the machine indicating the defect.

13. The method of claim 8 wherein, the machine is a rocket engine, the moving part is a set of gears coupled to a rotating shaft of the rocket engine, and the tachometer signal indicates the periodic rotation of the rotating shaft.

14. A method of determining a defect in a rocket engine having a gear box enclosing a rotating shaft with gears coupled to the rotating shaft, the method comprising the steps of:

operating the rocket engine during run time for producing vibrations from the gear box, the rotating shaft moving at a periodic rate, receiving vibration signals from the vibrations of the gear box, receiving tachometer signals indicating the rate of the periodic rotation of the rotating shaft, acquiring the vibration signals and the tachometer signals, the vibration signals and the tachometer signals are synchronized in time, recording the vibration and tachometer signals, playing back the vibration and tachometer signals, converting the vibration and tachometer signals into digital form into converted vibration signals and converted tachometer signals, respectively, transforming the converted vibration signals into a Fourier spectrum vibration signal, calculating a two-sided autospectral density signal from the Fourier spectrum vibration signal, logarithmically converting the two-sided autospectral density signal into a logarithmic autospectral density signal, inverse transforming the logarithmic autospectral density signal into a cepstrum vibration signal, detecting a speed signal from the converted tachometer signals, averaging the speed signal into an average speed signal, inverting the average speed signal into an average periodic time value signal, detecting the cepstrum vibration signal at the average periodic time value signal for providing a cepstrum parameter, the cepstrum vibration signal and the average periodic time value signal are synchronized in time, the average periodic time value signal has an average periodic time value for locating the cepstrum parameter as a value of the cepstrum vibration signal at a point during the run time, repeating all of the repeating steps a plurality of times for a plurality of like rocket engines for generating sets of cepstrum values for generating a base line of normally operating rocket engines for the plurality of like rocket engines over the run time, and for generating a respective plurality of cepstrum parameters for the rocket engine as a test set of cepstrum parameters, and comparing the test set of cepstrum parameters to the base line of normally operating like rocket engines for determining when the test set of cepstrum parameters are within the base line for indicating a proper operation of the rocket engine under test and for determining when the test set of cepstrum parameters are outside the base line for indicating a defective operation of the rocket engine under test indicating the defect.

15. The method of claim 14 further comprising the step of:
storing the base line of cepstrum parameters for the plurality of like rocket engines.

16. The method of claim 14 wherein, the vibration signals are generated from accelerometers disposed on the gear box, and tachometer signals are generated from a magnetic transducer disposed on the gear box.

17. The method of claim 14 wherein, the rocket engine is a liquid propellant rocket engine.

18. The method of claim 14 wherein, the averaging step averages time displacements between peaks of the tachometer signals, the peaks occurring at the periodic rate of the rotating shaft, the periodic rate corresponding to the revolution rate of the shaft, the average speed signal being a rotation rate value of the periodic rate.

19. The method of claim 14 wherein, the ceptrum vibration signal detecting step detects a cepstrum peak value of the cepstrum vibration signal at a periodic time associated with the inverse of the average rotation rate of the shaft, and the cepstrum peak value tending to increase in value as the defect in the gear box progressing towards failure of the rocket engine.

20. The method of claim 14 wherein, the defect is a gear tooth defect of the gear.

* * * * *